(12) United States Patent
Brocas et al.

(10) Patent No.: US 12,065,525 B2
(45) Date of Patent: Aug. 20, 2024

(54) WATER-SOLUBLE COPOLYMER COMPOSITION

(71) Applicant: Arkema France, Colombes (FR)

(72) Inventors: Anne-Laure Brocas, Lacq (FR); Sylvain Bourrigaud, Lacq (FR); Sylvie Cazaumayou, Lacq (FR)

(73) Assignee: Arkema France, Colombes (FR)

( * ) Notice: Subject to any disclaimer, the term of this patent is extended or adjusted under 35 U.S.C. 154(b) by 635 days.

(21) Appl. No.: 17/291,468

(22) PCT Filed: Nov. 8, 2019

(86) PCT No.: PCT/FR2019/052667
§ 371 (c)(1),
(2) Date: May 5, 2021

(87) PCT Pub. No.: WO2020/095003
PCT Pub. Date: May 14, 2020

(65) Prior Publication Data
US 2021/0395414 A1  Dec. 23, 2021

(30) Foreign Application Priority Data

Nov. 8, 2018 (FR) ...................... 1860275

(51) Int. Cl.
| C08F 212/08 | (2006.01) |
| C08F 2/38 | (2006.01) |
| C08F 220/06 | (2006.01) |
| C08F 220/18 | (2006.01) |
| C08K 5/32 | (2006.01) |

(52) U.S. Cl.
CPC .............. *C08F 212/08* (2013.01); *C08F 2/38* (2013.01); *C08F 220/06* (2013.01); *C08F 220/18* (2013.01); *C08F 220/1804* (2020.02); *C08K 5/32* (2013.01); *C08F 2438/01* (2013.01); *C08F 2438/02* (2013.01); *C08F 2438/03* (2013.01)

(58) Field of Classification Search
CPC .............. C08F 220/1804; C08F 220/18; C08F 220/06; C08F 212/08; B33Y 70/00; B29C 210/08
See application file for complete search history.

(56) References Cited

U.S. PATENT DOCUMENTS

| 5,171,802 | A | * | 12/1992 | Salazar | ................. C08F 220/06 526/225 |
| 7,879,957 | B2 | * | 2/2011 | Sunamori | ................. C08F 2/01 526/310 |
| 9,777,090 | B2 | | 10/2017 | Ruggieri et al. | |
| 11,453,735 | B2 | * | 9/2022 | Brocas | ................... B33Y 70/00 |
| 2004/0097644 | A1 | * | 5/2004 | Katou | ....................... C08F 8/44 106/3 |
| 2005/0288428 | A1 | * | 12/2005 | Dupont | .................. D21H 19/58 524/556 |
| 2018/0179108 | A1 | * | 6/2018 | Yu | .......................... C08F 220/20 |
| 2020/0040120 | A1 | | 2/2020 | Inoubli et al. | |

FOREIGN PATENT DOCUMENTS

| CN | 106632821 | A | * | 5/2017 | ............ C08F 220/18 |
| DE | 44 42 577 | A1 | * | 6/1996 | ................. C08F 2/22 |
| DE | 198 33 061 | A1 | * | 2/2000 | ................. C08F 2/24 |
| DE | 699 22 011 | T2 | * | 3/2005 | ................. C08F 2/22 |
| EP | 0 314 326 | A1 | * | 5/1989 | ............ C08F 220/12 |
| EP | 2041192 | A1 | | 4/2009 | |
| EP | 2447292 | A1 | | 5/2012 | |
| EP | 2699611 | A1 | | 2/2014 | |
| FR | 3030529 | A1 | | 6/2016 | |
| WO | 9850477 | A1 | | 11/1998 | |
| WO | 2015175682 | A1 | | 11/2015 | |

OTHER PUBLICATIONS

International Search Report and Written Opinion for International Application No. PCT/FR2019/052667, dated Feb. 28, 2020, 8 pages.

* cited by examiner

*Primary Examiner* — Rip A Lee
(74) *Attorney, Agent, or Firm* — Buchanan Ingersoll & Rooney PC

(57) ABSTRACT

The present invention relates to the field of water-soluble or water-dispersible copolymers comprising at least one random copolymer comprising styrene, methacrylic acid, acrylic acid and butyl acrylate.

12 Claims, 1 Drawing Sheet

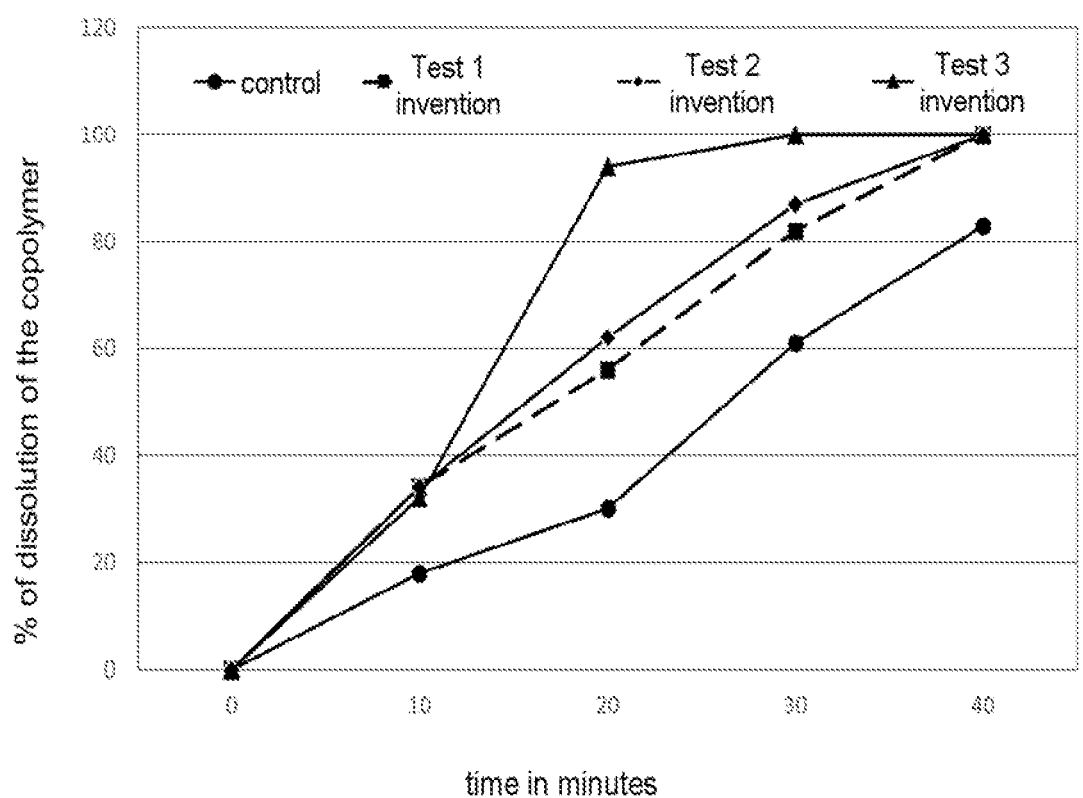

WATER-SOLUBLE COPOLYMER COMPOSITION

CROSS-REFERENCE TO RELATED APPLICATIONS

This is the national phase of International Application No. PCT/FR2019/052677, filed 8 Nov. 2019, which claims priority to French Application No. FR 18.60275, filed 8 Nov. 2018. The disclosure of each of these applications is incorporated herein by reference in its entirety for all purposes.

FIELD OF THE INVENTION

The present invention relates to the field of water-soluble or water-dispersible copolymers comprising at least one random copolymer comprising styrene, methacrylic acid, acrylic acid and butyl acrylate.

Such copolymers dissolve or disperse more rapidly in water than polymers known from the prior art.

This invention is valued in various uses of these copolymers as dispersing agents for pigments, as rheology modifiers in applications as diverse as drilling muds, textile printing pastes, the cosmetics industry, or also the detergents industry, coatings, such as paint, anti-settling and/or suspending agents for coarse inorganic or organic fillers, for example in phytosanitary applications, but especially in three-dimensional printing (or 3D printing) of an object and more particularly as sacrificial materials of fused deposition modeling.

As regards more particularly the field of three-dimensional printing (or 3D printing), this technology makes possible the additive manufacturing (or AM) of a real object from a virtual object. It is based on cutting the 3D virtual object into 2D slices of very thin thickness. These thin slices are deposited one by one by fixing them onto the preceding slices, which reconstitutes the real object. The constituent materials of the object include plastics (in particular acrylonitrile-butadiene-styrene (or ABS) and polylactic acid (or PLA)), wax, metal or ceramics. Examples of additive techniques are fused deposition modeling (or FDM) and laser sintering.

Fused deposition modeling is a mechanical technique which consists in melting a filament of synthetic material (generally plastic of ABS or PLA type) through an extrusion nozzle heated to a temperature varying between 160 and 270° C. A molten filament, with a diameter of the order of a tenth of a millimeter, emerges from this nozzle. This string is deposited in a line and bonds by remelting onto that which has been deposited previously. This technique makes it possible to create parts made of good material, which have mechanical and thermal characteristics and a stability which are identical to those of injection-molded thermoplastic parts. This technique also has a major advantage concerning the support structure required for the production of the parts, since this construction support usually consists of a material other than that which constitutes the created object, which material is removed from said object when the process for construction of the latter is finished.

The construction support is generally a water-soluble or water-dispersible polymer composition corresponding to very precise specifications. Among the desired properties, in addition to the mechanical strength, the glass transition temperature of the copolymer, its thermal stability or its ease of processing, the kinetics of dissolution or of dispersibility in water are of primary importance.

BACKGROUND OF THE INVENTION

EP 2 447 292, EP 2 699 611 and EP 2 041 192 describe water-dispersible soluble compositions or copolymers used in the field of 3D printing.

These compositions consist of random copolymers comprising monomers such as maleic anhydride (EP 2 699 611), methacrylic acid (EP 2 041 192), more generally α,β-unsaturated monocarboxylic acids (EP 2 447 292) polymerized by radical polymerization. WO2015175682 describes a copolymer comprising neutralized carboxylic groups which is soluble in an alkaline aqueous solution. WO9850477 describes a composition of styrene, butyl acrylate, acrylic acid and methacrylic acid in Examples 3, 4 and 5. The applicant company has observed that these compositions are very difficult to isolate from a process viewpoint.

However, such compositions exhibit kinetics of dissolution or of dispersibility in water which are still too slow. Increasing the proportion of hydrophilic monomers might constitute a solution but, in this case, other important characteristics, such as the Tg, the thermal stability, some process characteristics, such as the recovery of the polymer, the melt flow index or also the mechanical properties, are degraded.

The applicant company has now discovered that a composition comprising a random copolymer comprising acrylic acid, methacrylic acid, butyl acrylate and styrene exhibits a much faster dissolution than the known compositions of the prior art. Thus, the replacement of a small proportion of the methacrylic acid by acrylic acid makes possible an improvement in the dissolution while maintaining the other characteristics of the product obtained (the glass transition temperature, the thermal stability, certain process characteristics, such as the recovery of the polymer, the melt flow index or also the mechanical properties)

SUMMARY OF THE INVENTION

The invention thus relates to a composition comprising a random copolymer comprising the following monomers:
styrene, from 28% to 45% by weight, limits included;
methacrylic acid, from 10% to 40% by weight, limits included;
acrylic acid, from 1% to 15% by weight, limits included.
butyl acrylate, from 18% to 35% by weight, limits included.

BRIEF DESCRIPTION OF THE DRAWINGS

FIG. 1 illustrates the dissolution of a control copolymer and the test 1, test 2 and test 3 copolymers of the invention at pH=12 and 60° C.

DETAILED DESCRIPTION OF THE INVENTION

Dissolution or dispersibility in water is understood to mean a dissolution or a dispersibility in an aqueous phase, the pH of which is between 5.5 and 14, limits included, preferably between 8 and 12 and more particularly between 8 and 10, limits included, in a temperature range of between 40° C. and 70° C.

A copolymer is said to be "dispersible" if it forms, at a concentration of 5% by weight in a solvent, at 25° C., a stable suspension of fine, generally spherical, particles. The mean size of the particles constituting said dispersion is less than 1 µm and, more generally, varies between 5 and 400 nm, preferably from 10 to 250 nm, by weight. These particle sizes are measured by light scattering.

When the solvent is water, the term used is "water-dispersible" copolymer.

The copolymers of the invention can be prepared by radical polymerization or by controlled radical polymerization. When it is a question of obtaining a water-soluble or water-dispersible copolymer, the applicant company observes, however, that it is preferable to use controlled radical polymerization and that the copolymer thus prepared is more rapidly dissolved or dispersed in aqueous solution.

To this effect, use may be made of any type of controlled radical polymerization in the context of the invention, such as NMP ("Nitroxide Mediated Polymerization"), RAFT ("Reversible Addition and Fragmentation Transfer"), ATRP ("Atom Transfer Radical Polymerization"), INIFERTER ("Initiator-Transfer-Termination"), RITP ("Reverse Iodine Transfer Polymerization") or ITP ("Iodine Transfer Polymerization").

According to a preferred form of the invention, the copolymers are prepared by nitroxide mediated polymerization (NMP).

More particularly, the nitroxides resulting from the alkoxyamines derived from the stable free radical (1) are preferred.

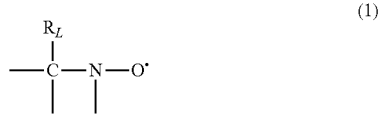

(1)

in which the radical $R_L$ exhibits a molar mass of greater than 15.0342 g/mol. The radical $R_L$ can be a halogen atom, such as chlorine, bromine or iodine, a saturated or unsaturated and linear, branched or cyclic hydrocarbon group, such as an alkyl or phenyl radical, or an ester —COOR group or an alkoxyl —OR group or a phosphonate —PO(OR)$_2$ group, provided that it exhibits a molar mass of greater than 15.0342. The radical $R_L$, which is monovalent, is said to be in the β position with respect to the nitrogen atom of the nitroxide radical. The remaining valencies of the carbon atom and of the nitrogen atom in the formula (1) can be bonded to various radicals, such as a hydrogen atom or a hydrocarbon radical, such as an alkyl, aryl or arylalkyl radical, comprising from 1 to 10 carbon atoms. It is not excluded for the carbon atom and the nitrogen atom in the formula (1) to be connected together via a divalent radical, so as to form a ring. Preferably, however, the remaining valencies of the carbon atom and of the nitrogen atom of the formula (1) are bonded to monovalent radicals. Preferably, the radical $R_L$ exhibits a molar mass of greater than 30 g/mol. The radical $R_L$ can, for example, have a molar mass of between 40 and 450 g/mol. By way of example, the radical $R_L$ can be a radical comprising a phosphoryl group, it being possible for said radical $R_L$ to be represented by the formula:

(2)

in which $R^1$ and $R^2$, which can be identical or different, can be chosen from alkyl, cycloalkyl, alkoxyl, aryloxyl, aryl, aralkyloxyl, perfluoroalkyl or aralkyl radicals and can comprise from 1 to 20 carbon atoms. $R^1$ and/or $R^2$ can also be a halogen atom, such as a chlorine or bromine or fluorine or iodine atom. The radical $R_L$ can also comprise at least one aromatic ring, such the phenyl radical or the naphthyl radical, it being possible for said ring to be substituted, for example by an alkyl radical comprising from 1 to 4 carbon atoms.

More particularly, the alkoxyamines derived from the following stable radicals are preferred:
N-(tert-butyl)-1-phenyl-2-methylpropyl nitroxide,
N-(tert-butyl)-1-(2-naphthyl)-2-methylpropyl nitroxide,
N-(tert-butyl)-1-diethylphosphono-2,2-dimethylpropyl nitroxide,
N-(tert-butyl)-1-dibenzylphosphono-2,2-dimethylpropyl nitroxide,
N-phenyl-1-diethylphosphono-2,2-dimethylpropyl nitroxide,
N-phenyl-1-diethylphosphono-1-methylethyl nitroxide,
N-(1-phenyl-2-methylpropyl)-1-diethylphosphono-1-methylethyl nitroxide,
4-oxo-2,2,6,6-tetramethyl-1-piperidinyloxy,
2,4,6-tert-butyl-phenoxy nitroxide,
N-(tert-butyl)-1-diethylphosphono-2,2-dimethylpropyl nitroxide.

The alkoxyamines used in controlled radical polymerization must allow good control of the linking of the monomers. Thus, they do not all allow good control of certain monomers. For example, the alkoxyamines derived from TEMPO make it possible to control only a limited number of monomers; the same is true for the alkoxyamines derived from 2,2,5-trimethyl-4-phenyl-3-azahexane-3-nitroxide (TIPNO). On the other hand, other alkoxyamines derived from the nitroxides corresponding to the formula (1), particularly those derived from the nitroxides corresponding to the formula (2) and more particularly still those derived from N-(tert-butyl)-1-diethylphosphono-2,2-dimethylpropyl nitroxide, make it possible to broaden, to a large number of monomers, the controlled radical polymerization of these monomers.

In addition, the opening temperature of the alkoxyamines also influences the economic factor. The use of low temperatures will be preferred in order to minimize the industrial difficulties. The alkoxyamines derived from the nitroxides corresponding to the formula (1), particularly those derived from the nitroxides corresponding to the formula (2) and more particularly still those derived from N-(tert-butyl)-1-diethylphosphono-2,2-dimethylpropyl nitroxide will thus be preferred to those derived from TEMPO or 2,2,5-trimethyl-4-phenyl-3-azahexane-3-nitroxide (TIPNO).

The constituent monomers of the copolymers will be chosen from styrene, methacrylic acid, acrylic acid and butyl acrylate.

The proportion by weight of the monomers is chosen in the following ranges:
styrene, from 28% to 45% by weight, preferably from 28% to 40%, limits included;
methacrylic acid, from 10% to 40% by weight, preferably between 15% and 36%, limits included;
acrylic acid, from 0.5% to 15% by weight, preferably between 1% and 5%, limits included;
butyl acrylate, from 18% to 35% by weight, preferably from 20% to 30%, limits included.

The weight-average molecular weight of the water-soluble or water-dispersible copolymers which are a subject matter of the invention is between 30 000 g/mol and 300 000 g/mol, preferably between 70 000 and 170 000 g/mol and more preferably between 80 000 and 130 000 g/mol.

The dispersity of the water-soluble or water-dispersible copolymers is less than 2.2 and preferably less than 2.

The glass transition temperature (Tg), measured by DMA (dynamic mechanical analysis), of the random copolymer present in the composition which is a subject matter of the invention is greater than 60° C. and preferably greater than 110° C.

The water-soluble or water-dispersible compositions which are a subject matter of the invention can contain impact modifiers, whether they are of the random or block copolymer type, or also core-shell particles, alone or in combination.

The compositions of the invention can be used as dispersing agents for pigments, or also as rheology modifiers in applications as diverse as drilling muds, textile printing pastes, the cosmetics industry, or also the detergents industry, and other coating compositions, such as paint, and as anti-settling and/or suspending agent for coarse inorganic or organic fillers in various fields, such as, for example, the phytosanitary field, but also the field of three-dimensional printing (or 3D printing) of an object of the FDM (fused deposition modeling) type as sacrificial polymer. As such, the compositions of the invention can be formed in the form of an extruded filament, with or without impact modifiers, these extruded filaments also being a subject matter of the invention.

The invention also relates to the objects obtained by means of the compositions of the invention.

EXAMPLES

The mixture of reactants is as follows:
Initiator: BlocBuilder® (from Arkema); controlled radical polymerization initiator
Styrene (St) (from Aldrich)
Methacrylic acid (MAA) (from Aldrich)
Acrylic acid (AA) (from Aldrich)
Butyl acrylate (BuA) (from Aldrich)
Ethanol (from Aldrich)
Toluene (from Aldrich)
The charging of the reactors is given in table 1

TABLE 1

|  | Control | Test 1 invention | Test 2 invention | Test 3 invention |
| --- | --- | --- | --- | --- |
| Initiator | 1.7 g | 2.1 g | 2.1 g | 1.5 g |
| Styrene | 149.3 | 187 g | 187.9 g | 130 g |
| Methacrylic acid | 200 g | 238.4 g | 218.5 g | 120 |
| Acrylic acid | 0 | 11.2 g | 31.1 g | 55.1 g |
| Butyl acrylate | 153 g | 187 g | 188 g | 132 g |
| Ethanol | 179 g | 224 g | 224.3 g | 160 g |
| Toluene | 119 g | 150 g | 150 g | 110 |
| Reactor temperature | 110-118° C. | 110-118° C. | 110-118° C. | 110-118° C. |

All of the reagents and solvents are introduced into a closed 2 l stainless steel reactor, under a nitrogen atmosphere. The mixture is heated for 180 minutes, with stirring of 200 rpm.

The final conversion is 71%.

The solvents and residual monomers are removed in a vacuum oven at 100° C. The residue obtained is ground in a mortar to be used in the powder form.

GPC Measurements

The measurement of the masses by size exclusion chromatography (polystyrene standards) leads to the following results (table 2):

TABLE 2

|  | Control | Test 1 invention | Test 2 invention | Test 3 invention |
| --- | --- | --- | --- | --- |
| Mn | 58 000 | 59 000 | 62 000 | 55 000 |
| Mw | 110 000 | 113 000 | 110 000 | 105 000 |
| Mp | 108 000 | 113 000 | 114 000 | 105 000 |
| PI | 1.9 | 1.9 | 1.8 | 1.9 |

The composition of the three copolymers is analyzed by $^1$H NMR and gives the following results as % by weight, table 3:

TABLE 3

|  | Control | Test 1 invention | Test 2 invention | Test 3 invention |
| --- | --- | --- | --- | --- |
| Styrene | 37 | 38.2 | 38 | 39 |
| Methacrylic acid | 40 | 34 | 35 | 16 |
| Acrylic acid |  | 1.8 | 3 | 15 |
| Butyl acrylate | 23 | 26 | 24 | 30 |

Dissolution Tests

The copolymers obtained are heated to a temperature of 160° C. under a compression molding press to form a pellet with a diameter of 2.5 cm and a thickness of 1 mm. The pellets are subsequently placed in a beaker, with stirring, in an alkaline medium (buffer solution) at a temperature of 60° C.

The samples are periodically removed and weighed in order to evaluate the weight loss as % linked to the dissolution of the copolymer. The tests are carried out at a pH of 12 at 60° C.

TABLE 4

| | Weight loss % | | | |
| --- | --- | --- | --- | --- |
| Time (min) | Control | Test 1 invention | Test 2 invention | Test 3 invention |
| 0 | 0 | 0 | 0 | 0 |
| 10 | 18 | 34 | 34 | 32 |

TABLE 4-continued

| Time (min) | Weight loss % | | | |
|---|---|---|---|---|
| | Control | Test 1 invention | Test 2 invention | Test 3 invention |
| 20 | 30 | 56 | 62 | 94 |
| 30 | 61 | 82 | 87 | 100 |
| 40 | 83 | 100 | 100 | 100 |

The dissolution of the control copolymers the copolymers of the control, the invention test 1, 2 and 3 at pH=12 and 60° C. is displayed in FIG. 1.

It is observed that the copolymers prepared using the four monomers St/MAA/AA/BuA (invention) dissolve more quickly than those prepared without acrylic acid while having a proportion of hydrophilic monomers (MAA+AA) which is slightly lower in molar proportion.

The invention claimed is:

1. A composition comprising a random copolymer comprising units derived from the following monomers:
   styrene, from 28% to 45% by weight, limits included;
   methacrylic acid, from 10% to 40% by weight, limits included;
   acrylic acid, from 0.5% to 5% by weight, limits included;
   butyl acrylate, from 18% to 35% by weight, limits included.

2. The composition as claimed in claim 1, wherein the random copolymer is prepared by controlled radical polymerization.

3. The composition as claimed in claim 1, wherein a weight-average molecular weight of the random copolymer is between 30 000 and 300 000 g/mol.

4. The composition as claimed in claim 1, wherein the composition has a glass transition temperature, measured by DMA, of greater than 60° C.

5. The composition as claimed in claim 2, wherein the controlled radical polymerization is carried out by controlled radical polymerization of RAFT type.

6. The composition as claimed in claim 2, wherein the controlled radical polymerization is carried out by controlled radical polymerization of ATRP type.

7. The composition as claimed in claim 2, wherein the controlled radical polymerization is carried out by controlled radical polymerization of NMP type.

8. The composition as claimed in claim 7, wherein a nitroxide from the NMP results from an alkoxyamine which is derived from a stable radical of formula (1):

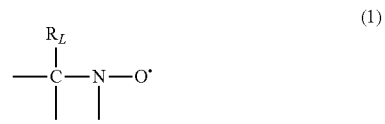

wherein the radical $R_L$ exhibits a molar mass of greater than 15.0342 g/mol.

9. The composition as claimed in claim 8, wherein the alkoxyamine is derived from the following stable radicals:
   N-(tert-butyl)-1-phenyl-2-methylpropyl nitroxide,
   N-(tert-butyl)-1-(2-naphthyl)-2-methylpropyl nitroxide,
   N-(tert-butyl)-1-diethylphosphono-2,2-dimethylpropyl nitroxide,
   N-(tert-butyl)-1-dibenzylphosphono-2,2-dimethylpropyl nitroxide,
   N-phenyl-1-diethylphosphono-2,2-dimethylpropyl nitroxide,
   N-phenyl-1-diethylphosphono-1-methylethyl nitroxide,
   N-(1-phenyl-2-methylpropyl)-1-diethylphosphono-1-methylethyl nitroxide,
   4-oxo-2,2,6,6-tetramethyl-1-piperidinyloxy,
   2,4,6-tert-butylphenoxy nitroxide.

10. The composition as claimed in claim 9, wherein the alkoxyamine is derived from N-(tert-butyl)-1-diethylphosphono-2,2-dimethylpropyl nitroxide.

11. A material comprising the composition as claimed in claim 1, wherein the material is a pigment, a drilling mud, a textile printing paste, a cosmetic, a detergent, or a coarse inorganic or organic filler.

12. A filament extruded from the composition of claim 1.

* * * * *